_Patented July 2, 1946_

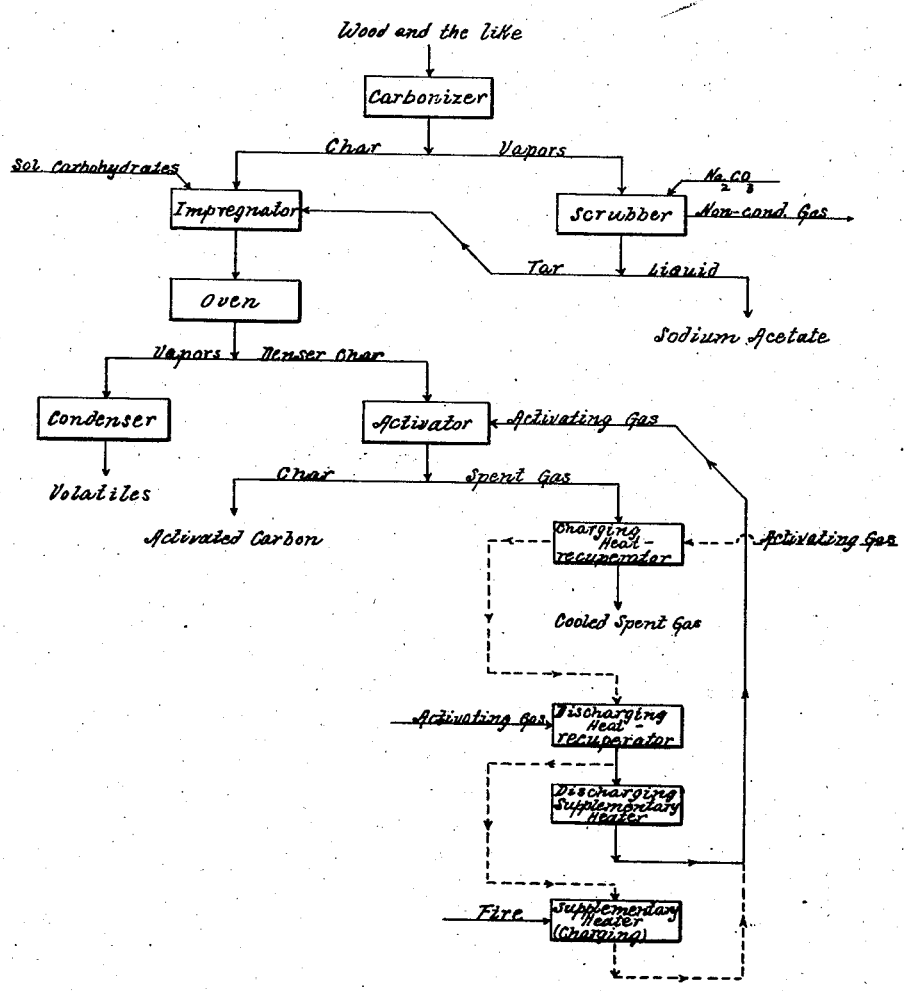
INVENTOR.

2,403,140

UNITED STATES PATENT OFFICE 2,403,140

MAKING OF ACTIVATED CARBON

Alfred M. Thomsen, San Francisco, Calif., assignor to Pacific Acetate and Chemical Company, a corporation of California Application September 28, 1942, Serial No. 459,884

2 Claims. (Cl. 252—289)

This invention deals in general with the means whereby an acceptable type of activated carbon can be produced from many types of material not otherwise considered suitable and, in addition with means whereby the cost of producing said charcoal can be greatly reduced.

The process, in its entirety, is best understood by following the various steps indicated upon the attached flow sheet, but prior to the complete elucidation of same, some explanatory words, and comparisons with existing methods, are appropriate.

In general it is held that the characteristics of an activated carbon are determined by its physical structure. The actual phenomenon is still obscure. It is presumably due to the adsorption of the infinite number of tiny pores acting upon suitable substances, generally such as have a rather heavy molecular structure.

It may be well to consider what takes place when wood or woody substances are carbonized. In the breaking down of the carbohydrates of which wood is chiefly composed by the action of heat the carbon of same is principally left as a residue but a part is driven off in volatile, compound form.

The primary carbon thus produced is presumed to be actually in some highly "activated" form and thus capable of absorbing a part of the "primary" tar simultaneously produced. Such adsorbed tar becomes carbonized, in situ, and becomes a part of the residue left within the retort, a really very complex substance containing a hydrocarbon component, to which the generic name of charcoal is applied.

The object of activation is to remove this envelope of tar-coke from the charcoal and thus free the infinite number of tiny pores that have become choked with the tar residuum. Porosity is, of course, a very relative term. All charcoal is very porous and contains a great number of large pores, some large enough to be seen with the naked eye. But it is the infinite number of microscopic pores that only the most powerful of microscopes will detect that are the real active media.

The apparently "solid" walls of the porous charcoal consist entirely of this porous structure, and even the carbonized tar presents an equally porous aspect. The hardest and densest charcoals seem to the naked eye to have a glossy luster and a smooth surface on a fresh fracture. But after activation this same charcoal will under a powerful microscope have a dead-black appearance entirely devoid of lustre.

It has already been said that to free all these tiny pores of encrusting substances is the object of activation. It is accomplished by exposing the charcoal to agents that are capable of removing said incrustations, but all such are also to some extent capable of attacking the primary charcoal, whether it be formed from the original decomposition of carbohydrates or from the adsorbed tarry matter that subsequently are coked. It is the object, therefore, to so regulate matters that the minimum of desirable charcoal is removed in the process of activation.

Density of charcoal is thus to some extent an indication of the presence of a relatively large amount of this porous wall structure with relatively less volume lost in large, worthless, pores. However, it becomes possible to close up such large pores to a considerable extent by impregnating such low-density materials with a soluble carbohydrate or hydrocarbon, or both, and then carbonizing once more. In this manner a very dense charcoal can be produced from even porous woods.

This method can also be applied to material which has been partially activated previously, and finely powdered activated char can likewise be commingled with a binder, briquetted and redistilled in which case a very dense charcoal extremely suited for activation can be produced.

The principal agent used in activation is doubtless steam, which at temperatures permitting the water gas reaction has a selective action for the complex encrusting matter leaving the residual carbon in a highly activated form. However, even air alone or in the presence of steam also has its uses. The halogens at elevated temperatures have a similar selective action and at lower temperatures so has ammonia.

In any event, a gaseous medium is contacted with the char to be activated at elevated temperatures, as high as 2400° F. being not uncommon. It follows that the heat required to raise relatively large amounts of gas to such temperatures is considerable, and how to effect the raise is even more important as the transfer of heat at such temperatures is accompanied by much technical difficulty. To overcome this phase of the matter advantage is taken in one method of electric heating, the carbon itself being the resistor. Such means are necessarily quite costly both in first cost and in operation. For this reason all highly activated chars are decidedly costly and mitigate a great deal against their extended use in industry apart from where they must be employed.

I overcome this difficulty by making the activating gas itself the heat carrier of the reaction. Let a mixture of nitrogen and carbon dioxide, for example, be commingled with steam and "sharpened" by the further addition of chlorine, and let this be heated to the desired temperature by passing through a previously heated brick checker and then admitted to the charcoal to be activated, said charcoal being contained in an insulated chamber, and activation will duly proceed.

The issuing gases will still retain almost all of their sensible heat upon leaving the charcoal so they may evidently be passed through another brick checker and thus be stripped of their heat before they are discarded. Fresh activating gas may now be heated nearly to reaction temperature by passing through this checker and may then be raised to the required initial by passage through a supplementary heater which will have very little work to do. The process thus becomes heat-recuperative and the design is greatly simplified and cheapened.

This combination of relatively inexpensive plant and heat economy results in low costs for activation. Almost any type of wood waste can be employed to make the charcoal and singularly suited as the medium for increasing the density of the char, or for briquetting, is that form of "wood in solution" which we designate as the spent or waste liquors of the pulp industry.

The flow sheet shows as a preferred version such an operation in which "wood or the like" is carbonized to yield a char and the conventional gaseous products. These are "scrubbed" with a solution of sodium carbonate, or other alkaline soda salt, thus salvaging the acetic acid produced as well as the condensed tar. Such recovery of sodium acetate is a help in reducing the cost and the tar may be employed as indicated to increase the density of the char formed in the primary carbonization of woody substances.

In place of tar for this impregnation, or together with said tar, use may be made of soluble carbohydrates. Solutions of sugars and particularly of spent cooking liquor is here recommended. Impregnation will be aided if a partial vacuum is first induced in the pores of the charcoal which then will readily become penetrated by the liquid medium.

A second carbonization is now resorted to, and the flow sheet shows the resultant volatiles condensed while the char has become denser by virtue of the weight of the additive carbon which has been deposited within its pores.

Activation is the next step. By means of the dotted lines I have indicated the duplex nature of such items as heat recuperators and the supplementary heating stoves. The solid line is used to indicate the normal flow, and the dotted line to indicate the corresponding action when the device is not "on stream." It will be evident that all such devices must be built in parallel, so that by reversal of flow the heated device may give off its heat to the gases it is desired to heat.

It will also be apparent that no claim is made for any originality in the chemical aspects of activation. Be the fluid, air, or steam or any gas, or any combination of gases, it is apparent that the heat-recuperative cycle will function equally well. It is independent of the medium employed, hence on the flow sheet it is simply referred to as the "activating gas."

I have already indicated that this flow sheet is used as an illustration only. There are many modifications that may suggest themselves. Thus a partially activated char may be re-impregnated, a fully activated, powdered char may have briquetting added to said impregnation and then be re-activated. Such powdered char may be only fresh charcoal or it may be a discard of fully activated material which is returned to the circuit in order that it may issue in a more desirable physical condition.

Such minor modifications, or rather diverse applications, of the basal theme I consider as forming a part of this disclosure. Having thus fully described my process,

I claim:

1. The method of increasing the density of a char which comprises; impregnating said char with a liquid medium which on distillation will yield a carbonaceous residue; facilitating said impregnation by inducing a partial vacuum in the pores of said char during said impregnation; submitting said impregnated charcoal to sufficient heat to drive off the volatile portions of the impregnating medium, thus leaving the larger pores of the primary char partially filled with a secondary char.

2. The method of increasing the density of a char set forth in claim 1, with the added step that said impregnation and said heating be repeated until the char has reached the pre-determined density.

ALFRED M. THOMSEN.